(12) United States Patent
Anderson

(10) Patent No.: US 7,938,413 B2
(45) Date of Patent: May 10, 2011

(54) KNEE SCOOTER

(76) Inventor: Michael Dale Anderson, Jamul, CA (US)

( * ) Notice: Subject to any disclaimer, the term of this patent is extended or adjusted under 35 U.S.C. 154(b) by 105 days.

(21) Appl. No.: 11/956,703

(22) Filed: Dec. 14, 2007

(65) Prior Publication Data
US 2009/0152829 A1 Jun. 18, 2009

(51) Int. Cl.
*B62M 1/00* (2010.01)
(52) U.S. Cl. .................... 280/87.021; 135/65; 280/62
(58) Field of Classification Search .............. 135/65–86; 280/62, 278, 87.01–87.041
See application file for complete search history.

(56) References Cited

U.S. PATENT DOCUMENTS

| | | | | |
|---|---|---|---|---|
| 1,666,827 | A | * | 4/1928 | McFarlan .................... 280/87.05 |
| 4,159,110 | A | | 6/1979 | Dodenhoff |
| 4,722,356 | A | | 2/1988 | Rehder |
| 5,800,317 | A | | 9/1998 | Accetta |
| 5,839,740 | A | * | 11/1998 | Seeger ...................... 280/87.021 |
| 6,296,263 | B1 | | 10/2001 | Schultz et al. |
| 6,554,302 | B1 | | 4/2003 | Liu |
| 6,634,660 | B2 | * | 10/2003 | Miller ....................... 280/87.021 |
| 6,739,606 | B2 | | 5/2004 | Rappaport |
| 7,111,856 | B1 | | 9/2006 | Graham |
| 7,207,407 | B2 | * | 4/2007 | Huber ........................... 180/208 |
| 2001/0038186 | A1 | | 11/2001 | Wychozowycz |
| 2002/0070519 | A1 | | 6/2002 | Rappaport |
| 2004/0201192 | A1 | * | 10/2004 | Ramm ..................... 280/87.021 |
| 2006/0033297 | A1 | * | 2/2006 | Miller ...................... 280/87.021 |
| 2007/0182116 | A1 | * | 8/2007 | Davey et al. ............... 280/87.05 |
| 2009/0058036 | A1 | * | 3/2009 | Hoepner et al. .............. 280/267 |

OTHER PUBLICATIONS

Invacare. "Knee Walker". [Online] Dec. 24, 2007, <http://www.invacare.com/cgi-bin/imhqprd/inv_catalog/prod_detail>.
Jensen Medical Supply. "The Weil Knee Walker by Medicine". [Online] Dec. 24, 2007. <http://Jansenmedical.net/The-Weil-Knee-Walker-by-Medicine>.
A Leg Up. "Knee Scooters". [Online] Dec. 24, 2007. <http://alegup.biz/products.html>.
Reid Worldwide. "K9-Orthopedic Leg Trolley". [Online] Dec. 24, 2007. <http://www.walk-aid.co.uk/>.
Sunburst Medical. "Knee Walker". [Online] Dec. 24, 2007. <http://sunburstmedical.com/kneewalker>.
Roll-A-Bout Corporation. "Roll-A-Bout". [Online] Dec. 24, 2007. <http://www.roll-a-bout.com/>.
RollerAid. "Orthopedic Leg Support Scooter"[Online] Dec. 24, 2007. <http://www.rolleraid.com>.
Eldercare Robotics: A Personal Mobility Aid. "Walker"[Online] Dec. 24, 2007. <http://marc.med.virginia.edu/projects_eldercarerob.html>.

* cited by examiner

*Primary Examiner* — Lesley Morris
*Assistant Examiner* — Erez Gurari

(57) ABSTRACT

A knee scooter includes a substantially V-shaped chassis formed by a pair of extensions joined together at a vertex. At the vertex, the extensions form an angle of about sixty degrees. Further, the extensions establish a foot-space in the interior of the angle and define a chassis centerline that bisects the angle. An adjustment tube is selectively engageable with the first extension of the chassis to orient the adjustment tube substantially perpendicular to the plane of the chassis. Further, engagement with the first extension off-sets the adjustment tube from the centerline of the chassis. In use, a user rests one knee on the seat while propelling the knee scooter with his/her other leg in the foot-space.

20 Claims, 3 Drawing Sheets

KNEE SCOOTER

FIELD OF THE INVENTION

The present invention pertains generally to devices and methods used to facilitate movement by injured or disabled persons. More particularly, the present invention pertains to devices and methods that use a wheeled vehicle to support a person with one injured foot or lower leg during self-propelled movement. The present invention is particularly, but not exclusively, useful for mobilizing such an injured or disabled person in an upright ambulatory position.

BACKGROUND OF THE INVENTION

Often during rehabilitation of a foot or leg injury, a person cannot put weight on his/her injured limb. Typically, the person may use crutches which shift weight-bearing responsibilities to the person's upper body. Alternatively, the person may remain in a seated position for movement in a wheel chair. Another option is the use of a knee walker or knee scooter. Such a vehicle provides a support for the user's knee. Further, the support is typically mounted on wheels and is pulled or pushed by the user in response to propulsion by the user's other leg.

While the currently available knee walkers provide some mobility to injured and disabled persons, they also can place the user in a dangerous position. Specifically, current knee walkers are placed entirely to the side of a user. Therefore, the user must position the knee of his injured leg on the knee walker while pushing with his non-injured foot off of ground lateral to the knee walker. As a result, the user is unbalanced and there is a risk of falling. Also, the balance limitations of current knee walkers restrict their maneuverability.

In light of the above, it is an object of the present invention to provide a knee scooter which provides improved balance and support for a user. Another object of the present invention is to provide a knee scooter having a first configuration for supporting a standing user, and a second configuration for supporting a seated user. Yet another object of the present invention is to provide a knee scooter that is movable to a compact configuration for easy storage or transport. Still another object of the present invention is to provide a knee scooter capable of turning beyond 90 degrees, thereby allowing the knee scooter to turn around in its own length. Another object of the present invention is to provide a knee scooter that is easy to use, simple to manufacture and comparatively cost effective.

SUMMARY OF THE INVENTION

In accordance with the present invention, a vehicle is provided to transport a person with an injured foot or leg. For this purpose, the vehicle includes a seat on which the user can sit, or that may support a single leg in a kneeling position. With this structure, the vehicle may be considered to be a knee scooter. The knee scooter includes a substantially V-shaped, or tricycle, chassis that defines a plane. Structurally, the chassis includes a first extension joined to a second extension at a vertex to form an angle of about sixty degrees. Accordingly, the chassis defines a centerline that bisects the angle. Also, the extensions bound a foot-space in the interior of the angle.

For the present invention, the knee scooter includes an adjustment tube that is selectively engageable between the seat and the first extension of the chassis. When engaging the first extension, the adjustment tube is oriented substantially perpendicular to the chassis plane. Further, during engagement between the adjustment tube and the first extension, the adjustment tube is positioned at a distance "k" from the vertex to off-set the adjustment tube from the centerline of the chassis. In this manner, a user may rest a knee on the seat while propelling the knee scooter with the other leg in the foot-space. Also, the knee scooter is provided with a foot rest attached to the second extension to support the user's propelling leg to allow the user to relax his propelling leg while coasting or being pushed. Further, the foot rest allows the user to center his weight over the chassis centerline to increase stability of the knee scooter. When resting his propelling leg on the foot rest, the user may make sharp turns safely by shifting his weight by adjusting his torso and/or legs.

For control of the knee scooter, it is provided with a steering mechanism including an elongated front fork assembly. Structurally, the fork assembly includes a rod with a first end and a second end. Also, the steering mechanism includes a steering tube assembly formed with a hollow tube member to receive the rod of the front fork assembly. Importantly, the steering mechanism is lightweight. Coupled with the knee scooter design, the user may stand on his propelling leg on the chassis centerline and lift the front end of the knee scooter to pivot around in extremely tight quarters if necessary.

In order to provide for easy storage and transport of the knee scooter, the steering tube assembly is movable between a first position and a second position. In the first position, the steering tube assembly is engaged at the vertex of the chassis to extend substantially perpendicular to the plane of the chassis. In the second position, the steering tube assembly lies substantially in the plane of the chassis.

In order to hold the steering tube assembly in the first position, the knee scooter is provided with a latch mechanism connected to the steering tube assembly and a release knob connected to the chassis. Specifically, the latch mechanism includes a strap that protrudes from the steering tube assembly to engage the release knob. During engagement between the release knob and the latch mechanism, the steering tube assembly is held in the first position. When the release knob is disengaged from the latch mechanism, the steering tube assembly may be moved to the second position.

At the first end of the rod of the front fork assembly, a front wheel is rotatably mounted. Further, a handle bar is engaged with the second end of the rod for rotating the front wheel to steer the knee scooter. Also, a hand brake activator is mounted on the handle bar. In order to stop the knee scooter, the hand brake activator is connected to a lever with a brake pad rotatably mounted on the front fork assembly. With this construction, the hand brake activator may be used to operate the lever to establish contact between the brake pad and the front wheel. In addition to the front wheel, the knee scooter includes a pair of rear wheels. Structurally, each rear wheel is engaged with a respective extension of the chassis at a distance from the vertex.

In order to support a user in a sitting position, the knee scooter further includes a cross bar that is selectively engageable with the chassis. Specifically, a first end of the cross bar is attached to the first extension at a distance "s" from the vertex. Likewise, a second end of the cross bar is attached at the second extension at the distance "s" from the vertex. For such an embodiment, the adjustment tube is engaged with the cross bar to position the seat substantially over the centerline of the chassis.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
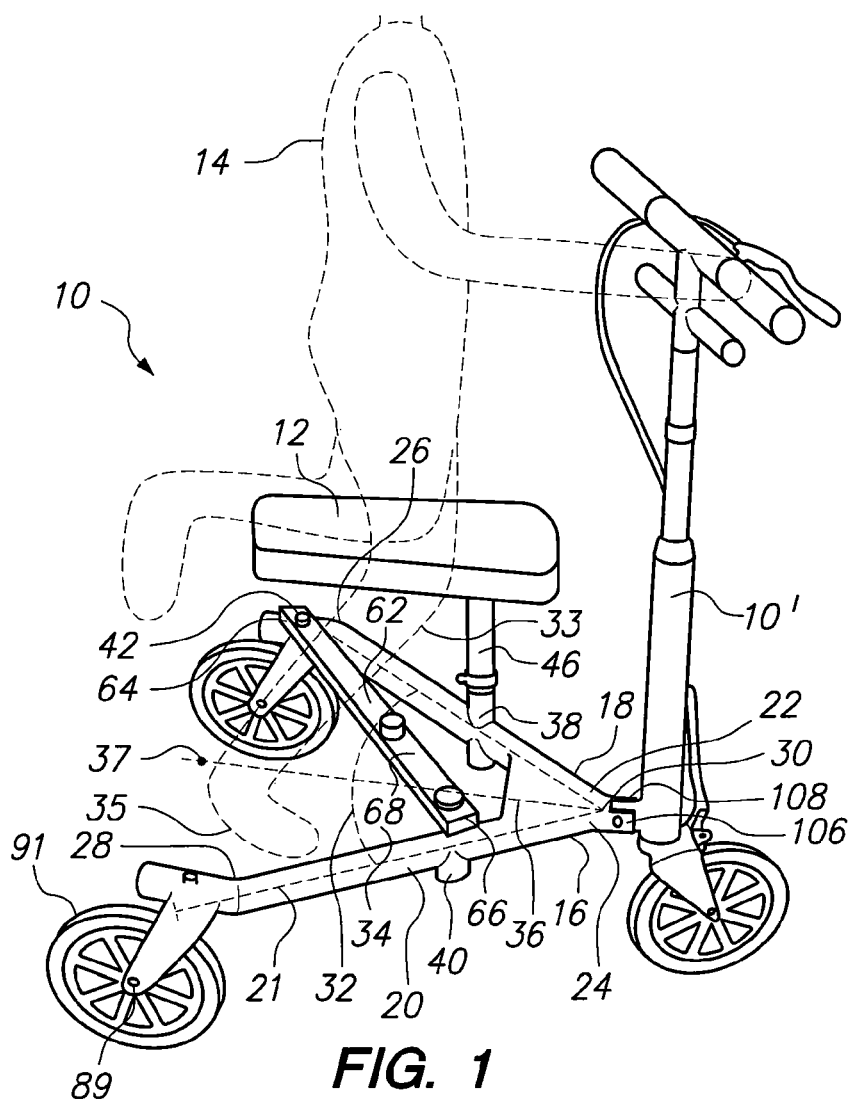
FIG. 1 is a perspective view of the knee scooter shown in a configuration for supporting a user's knee, with a cross bar stored on the chassis, in accordance with an embodiment of the present invention.

Referring initially to FIG. 1, a knee scooter, generally designated 10, is shown in position for supporting the knee 12 of a user 14, in accordance with the present invention. Structurally, the knee scooter 10 includes a substantially V-shaped chassis 16 formed from an extension 18 and an extension 20 to define a plane 21. Each extension 18, 20 includes a respective leading end 22, 24 and trailing end 26, 28. As shown, the leading end 22 of extension 18 joins the leading end 24 of extension 20 at a vertex 30 to form an angle 32 (preferably sixty degrees). Further, the extensions 18 and 20 define a foot-space 34 for receiving the user's other leg 33 and foot 35. For the invention, the angle 32 and foot-space 34 are bisected by a chassis centerline 36. As shown, the centerline 36 passes through a midpoint 37 between the trailing ends 26, 28.

Figure 2:
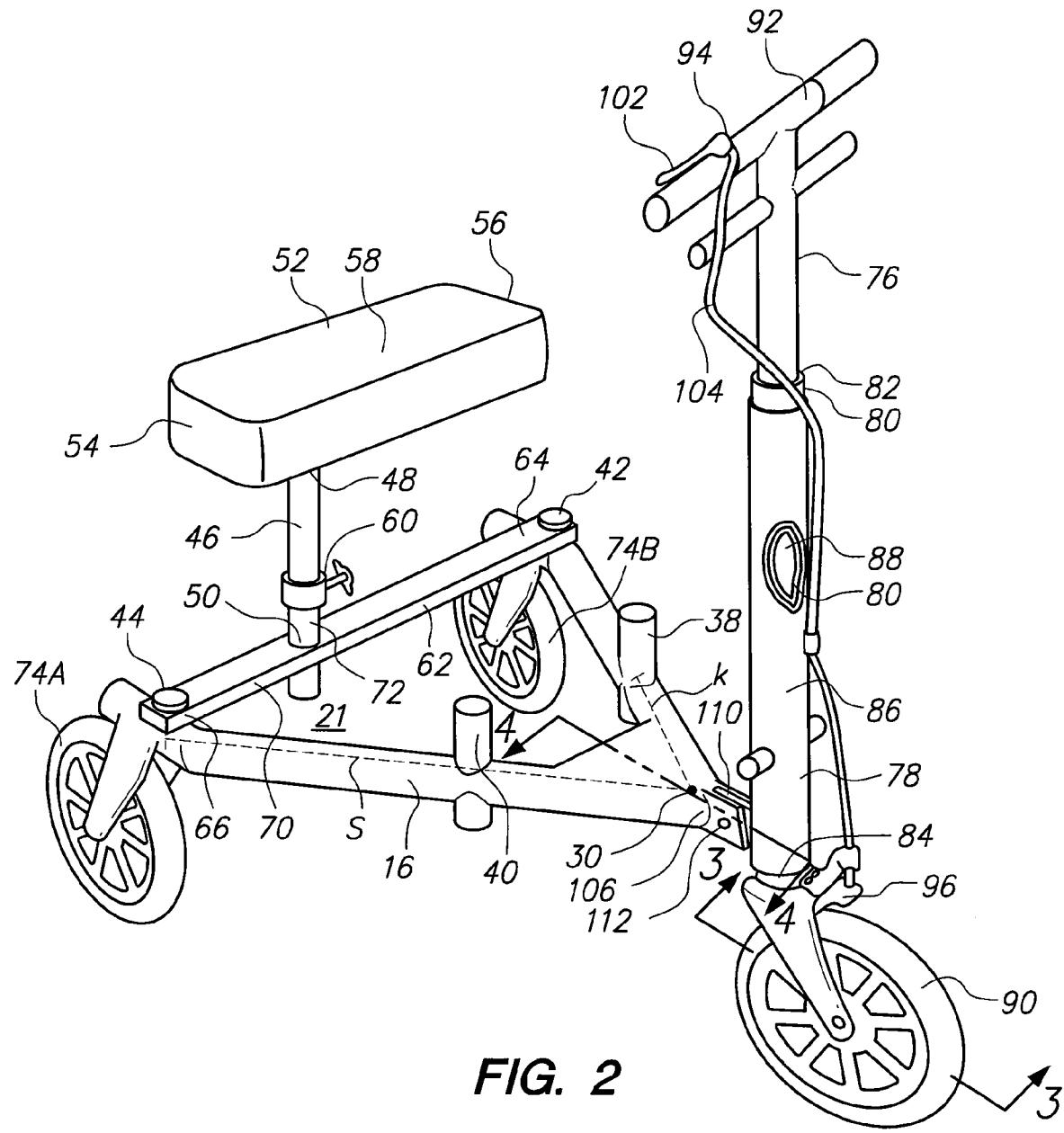
FIG. 2 is a perspective view of the knee scooter of FIG. 1 shown in a configuration for supporting a sitting user in accordance with an embodiment of the present invention.

In FIG. 2, the chassis 16 includes a forward pair of mounts 38 and 40 and a rear pair of mounts 42 and 44. As shown, each of the forward mounts 38, 40 is positioned a distance "k" from the vertex 30 of the chassis 16. Also, each of the rear mounts 42, 44 are positioned a distance "s" from the vertex 30. For purposes of the present invention, the knee scooter 10 includes an adjustment tube 46 having a top end 48 and a bottom end 50. The adjustment tube 46 is selectively engageable with the mounts 38 and 40. When the bottom end 50 engages a mount 38, 40, the adjustment tube 46 is oriented substantially perpendicular to the chassis plane 21. In FIG. 1, the adjustment tube 46 is fixed to the forward mount 38 on the extension 18 at the distance "k" (see FIG. 2) from the vertex 30. As a result, the adjustment tube 46 is off-set from the chassis centerline 36. As further shown, the knee scooter 10 includes a seat 52 that is mounted to the top end 48 of the adjustment tube 46. As shown, the seat 52 has an end 54 and an end 56 with a midpoint 58. For purposes of the present invention, the adjustment tube 46 connects to the seat 52 between the end 54 and the midpoint 58. Also, the adjustment tube 46 includes a clamp 60 for telescopically adjusting the distance between the top end 48 and the bottom end 50.

As shown in FIG. 2, the knee scooter 10 further includes a cross bar 62 having an end 64 and an end 66 which are selectively engageable with the chassis 16. For example, in FIG. 1, the cross bar 62 is shown in a stored configuration 68, with its end 64 fixed to the rear mount 42 on the extension 18 and its end 66 fixed to the forward mount 40 on the extension 20. However, the cross bar 62 may also be connected to the chassis 16 in a seated configuration 70, as shown in FIG. 2. In FIG. 2, the cross bar ends 64, 66 are fixed to a respective rear mount 42, 44. Further, in FIG. 2, the cross bar 62 includes an offset mount 72. As shown, the bottom end 50 of the adjustment tube 46 is fixed to the offset mount 72 so that the seat midpoint 58 is positioned above the chassis centerline 36. With this seated configuration 70, the seat 52 may support a seated user 14.

Figure 1A:
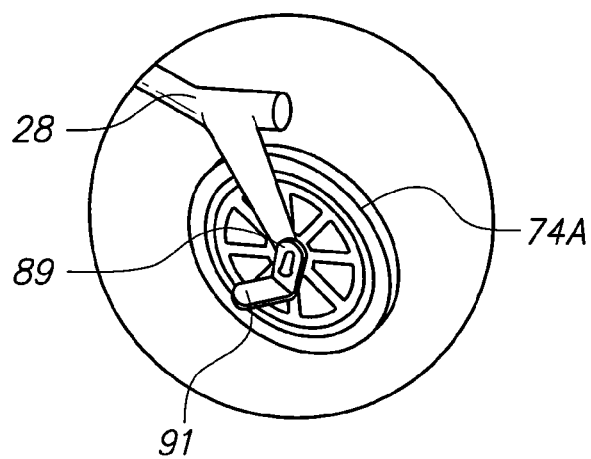
FIG. 1A is a perspective view of the trailing end of the chassis of the knee scooter in FIG. 1, showing the foot rest for use by the user's propelling foot.

Referring to FIGS. 1 and 2, the knee scooter 10 includes a pair of rear wheels 74a and 74b connected at the respective trailing ends 28, 26 of the extensions 20,18 by a respective axle 89. As shown in FIG. 1A, a foot rest 91 is attached to the trailing end 28 adjacent the wheel 74a on the axle 89. Preferably, the foot rest 91 provides for a tongue-and-groove attachment with the axle 89. As a result, the foot rest 91 may be easily connected to either trailing end 26,28, or removed altogether without the use of tools. Cross-referencing FIGS. 1 and 1A, it can be seen that the foot rest 91 extends into the foot-space 34, thereby allowing the user 14 to remain balanced while resting his propelling leg on the foot rest 91.

Referring back to FIGS. 1 and 2, the knee scooter 10 has a steering mechanism 76 connected to the chassis 16 at the chassis vertex 30. Structurally, the steering mechanism 76 includes an elongated front fork assembly 78 having a rod 80 with an end 82 and an end 84. Further, the steering mechanism 76 includes a steering tube assembly 86 formed with a hollow tube member 88. As shown in the exploded view in FIG. 2, the hollow tube member 88 receives the rod 80 of the front fork assembly 78.

Figure 3:
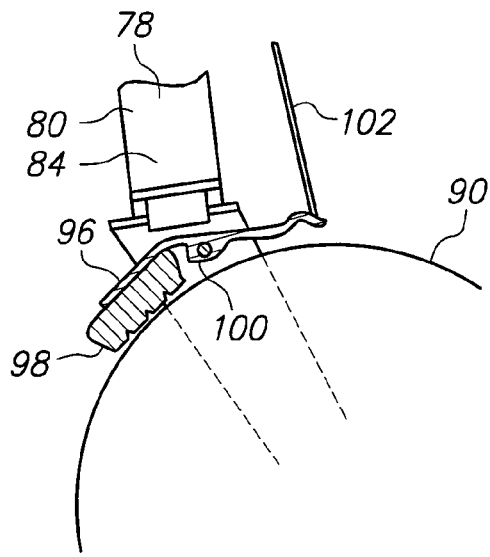
FIG. 3 is a cross sectional view of the lever and brake pad taken along line 3-3 in FIG. 2 to illustrate the details of the hand brake.

In FIGS. 1 and 2, the knee scooter 10 is shown to include a front wheel 90 that is engaged with the end 84 of the rod 80 of the front fork assembly 78. In order to steer the front wheel 90, the knee scooter 10 includes a handle bar 92 that is engaged with the end 82 of the rod 80 of the front fork assembly 78. With this structure, the front wheel 90 may be turned over ninety degrees in either direction to allow the knee scooter 10 to turn completely around in its own length. Also, the knee scooter 10 includes a hand brake 94 (see FIG. 2) that includes a lever 96 that supports a brake pad 98 (see FIG. 3). Structurally, the lever 96 is rotatably mounted on the front fork assembly 78 by a pin 100. Referring back to FIG. 2, the hand brake 94 is equipped with an activator 102 that is mounted on the handle bar 92. Further, the activator 102 is connected to the lever 96 by a tension line 104. As a result, the activator 102 may be depressed to pull the tension line 104 and cause rotation of the lever 96 about the pin 100 to force the brake pad 98 into contact with the front wheel 90 to slow and stop motion of the knee scooter 10.

Referring back to FIGS. 1 and 2, it is seen that the steering tube assembly 86 is pivotably engaged at the vertex 30 of the chassis 16. In FIG. 1, the chassis 16 includes a pair of tabs 106 that define a gap 108. In FIG. 2, it can be seen that the steering tube assembly 86 includes a projection 110 adjacent the end 84 of the rod 80. As shown in FIGS. 1 and 2, the projection 110 is received within the gap 108 and is connected to the tabs 106 by a fastener 112.

Figure 4:
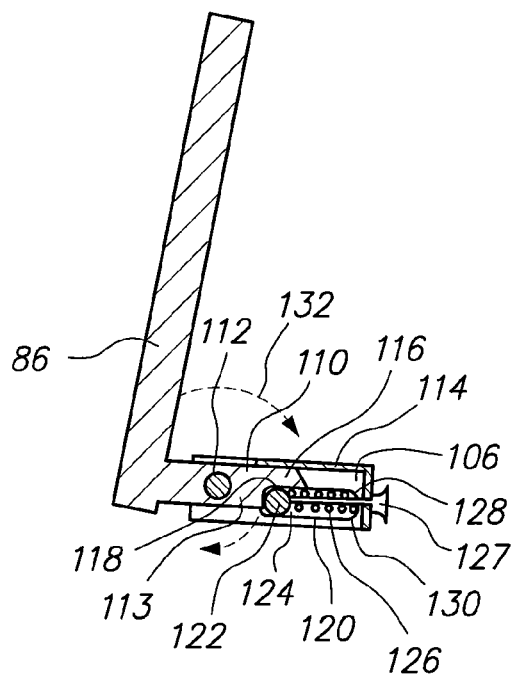
FIG. 4 is a cross sectional view of the latch mechanism and release knob taken along line 4-4 in FIG. 2 to illustrate the details of the connection therebetween.

In FIG. 4, the connection between the projection 110 of the steering tube assembly 86 and the tabs 106 of the chassis 16 is illustrated to include a latch mechanism 113. As shown by cross-referencing FIG. 2 with FIG. 4, the chassis 16 includes a cross member 114 that bounds the gap 108. Further, the projection 110 has a trailing end 116 with a cut-out portion 118 that is received within the gap 108. As shown, the cross member 114 abuts the trailing end 116 to prevent rotation of the steering tube assembly 86 about the fastener 112 in a counterclockwise direction as shown in FIG. 4. As further shown in FIG. 4, each tab 106 defines a slot 120. Further, a shaft 122 extends between the tabs 106 and is positioned in the slot 120. As shown in FIG. 4, the shaft 122 is biased to its first location 124 by a biasing mechanism 126 such as an extension spring. In order to move the shaft 122 from its first location 124, a knob 127 is mounted to the cross bar 114 and is connected to the shaft 122 by a rod 128. As a result, the knob 127 may be pulled to move the shaft 122 to a second location 130.

Figure 5:
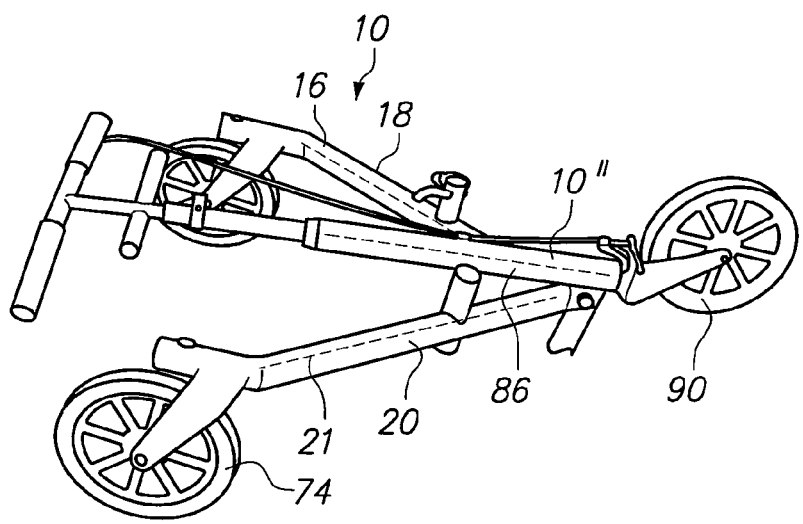
FIG. 5 is a perspective view of the knee scooter of FIGS. 1 and 2, shown with the steering tube assembly in its second position for storage or transporting of the knee scooter, in accordance with an embodiment of the present invention.

As shown in FIG. 4, when at the first location 124, the shaft 122 abuts the cut-out portion 118 of the projection 110 and prevents rotation of the steering tube assembly 86 about the fastener 112 in a clockwise direction as shown in FIG. 4 (in the direction of arrow 132). As a result, the knee scooter 10 is kept in its first position 10' in which the steering tube assembly 86 extends substantially perpendicular to the plane 21 of the chassis 16 (shown in FIG. 1). When the knob 127 is pulled to move the shaft 122 to its second location 130, the shaft 122 is disconnected from the cut-out portion 118 of the projection 110 of the steering tube assembly 86. As a result, the steering tube assembly 86 may be rotated about the fastener 112 in the direction of arrow 132 to position the knee scooter 10 in its second position 10" as shown in FIG. 5. When in the second position 10", the steering tube assembly 86 lies substantially in the plane 21 of the chassis 16. Further, the seat 52 and adjustment tube 46 may be removed from the chassis 16 as shown. As a result, the knee scooter 10 may be easily stored or transported when not in use.

While the particular Knee Scooter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A knee scooter which comprises:
a substantially V-shaped chassis forming a vertex with a first extension and a second extension extending therefrom at an angle to a respective first trailing end and second trailing end, with each extension having a forward mount and a rear mount, wherein the angle is bisected by a chassis centerline, wherein the first trailing end and the second trailing end define a trailing opening therebetween, and wherein the chassis establishes a foot-space bounded by the extensions and the trailing opening; and
a seat having a kneeling configuration in which the seat is selectively engageable with the forward mount on the first extension of the chassis to off-set the seat from the centerline of the chassis for resting a knee of a leg of a user thereon while allowing use of the other leg in the foot-space and through the trailing opening of the foot-space to propel the knee scooter.

2. A knee scooter as recited in claim 1 further comprising a cross bar selectively engageable with the chassis, the cross bar having a first end and a second end, wherein the seat has a sitting configuration in which each end of the cross bar is attached to a respective rear mount, and wherein the seat is selectively engageable with the cross bar for mounting the seat thereon to position the seat substantially over the chassis centerline for supporting the user in a sitting position.

3. A knee scooter as recited in claim 2 further including a stored configuration for the cross bar when the seat is in the kneeling configuration, wherein in the stored configuration the first end of the cross bar is selectively engageable with the rear mount on the first extension and the second end of the cross bar is selectively engageable with the forward mount on the second extension.

4. A knee scooter as recited in claim 3 wherein the rear mount on the first extension is equidistant to the rear mount on the second extension and to the forward mount on the second extension.

5. A knee scooter as recited in claim 1 further comprising a steering mechanism mounted on the chassis and movable between a first position in which the mechanism extends substantially perpendicular to the plane defined by the chassis and a second position in which the mechanism lies substantially in the plane of the chassis for storage.

6. A knee scooter as recited in claim 1 further comprising a foot rest attached to the second extension to support the other leg of the user while coasting in the kneeling configuration.

7. A knee scooter as recited in claim 6 wherein the seat and the foot rest cooperate to stabilize the user over the chassis centerline.

8. A knee scooter having a kneeling configuration and a sitting configuration, the scooter comprising:
a tricycle chassis having a vertex and two trailing ends to establish a foot-space for the chassis behind the vertex and between the trailing ends, and wherein the vertex and a midpoint between the trailing ends define a chassis centerline in the foot-space; and
a seat selectively mounted on the chassis in the kneeling configuration to be offset from the chassis centerline for resting a knee of a leg of a user thereon while allowing use of the other leg in the foot-space to propel the knee scooter, with the foot-space being unbounded between the trailing ends at a location to the rear of the seat in the kneeling configuration to allow egress of the other leg during propulsion; wherein the seat is selectively mounted to the chassis in the sitting configuration to be substantially over the centerline for supporting the user in a sitting position.

9. A knee scooter as recited in claim 8 further comprising:
a front wheel connected to the vertex; and
a pair of rear wheels, with each rear wheel connected to a respective trailing end.

10. A knee scooter as recited in claim 8 further comprising an adjustment tube selectively engageable with the chassis, wherein the adjustment tube is oriented substantially perpendicular to the plane of the chassis and is positioned at a distance "k" from the vertex, and wherein the adjustment tube interconnects the seat and the chassis.

11. A knee scooter as recited in claim 10 further comprising a mechanism mounted on the vertex of the chassis for steering the knee scooter, said mechanism having:
an elongated front fork assembly having a rod with a first end and a second end; and
a steering tube assembly formed with a hollow tube member for receiving the rod of the front fork assembly therein.

12. A knee scooter as recited in claim 11 wherein the steering tube assembly is engaged at the vertex of the chassis for movement between a first position wherein the steering tube assembly extends transverse to the plane of the chassis, and a second position wherein the steering tube assembly lies substantially parallel to the plane of the chassis.

13. A knee scooter as recited in claim 12 further comprising a latch mechanism including a projection extending from the steering tube assembly and a release knob mounted on the chassis, the release knob being engageable with the projection for selectively holding the steering tube assembly in the first position.

14. A knee scooter as recited in claim 13 further comprising:
   a handle bar engaged with the second end of the rod of the front fork assembly for rotating the front wheel to steer the knee scooter; and
   a hand brake including a lever with a brake pad rotatably mounted on the front fork assembly and an activator mounted on the handle bar for operating the lever to establish contact between the brake pad and the front wheel to stop the knee scooter.

15. A knee scooter as recited in claim 14 further comprising a cross bar selectively engageable with the chassis, the cross bar having a first end and a second end, wherein the first end is attached to the first extension at a distance "s" from the vertex, and the second end is attached to the second extension at a same distance "s" from the vertex, and wherein the adjustment tube is selectively engageable with the cross bar for mounting the seat thereon to position the seat substantially over the centerline for supporting the user in a sitting position.

16. A knee scooter which comprises:
   a substantially V-shaped chassis defining a plane and including a first extension and a second extension, wherein each extension has a trailing end and a leading end, wherein the leading ends of the extensions are joined together at an angle to form a vertex and to define a foot-space, wherein the angle is bisected by a chassis centerline, and wherein each extension includes a sitting mount and a kneeling mount;
   a cross bar having a first end, a second end, and an offset mount adjacent the first end, wherein the first end is selectively attached to a mount on the first extension, and the second end is selectively attached to a mount on the second extension, with said cross bar having a sitting configuration wherein each end is mounted to a respective sitting mount to position the cross bar perpendicular to the centerline, and with said cross bar having a stored configuration wherein the cross bar is attached to a sitting mount and to a kneeling mount; and
   an adjustment tube supporting a seat with the adjustment tube selectively engaged with the chassis in a kneeling configuration wherein the tube is engaged with a kneeling mount to off-set the adjustment tube from the centerline of the chassis and to allow a user to rest a knee of a leg on the seat while allowing use of a foot of the other leg in the foot-space to propel the knee scooter and, alternatively, with said adjustment tube selectively engaged in a sitting configuration wherein said adjustment tube is engaged with the offset mount of the cross bar to position the seat substantially over the centerline for supporting the user in a sitting position.

17. A knee scooter as recited in claim 16 further comprising a steering means including:
   an elongated front fork assembly having a rod with a first end and a second end; and
   a steering tube assembly formed with a hollow tube member for receiving the rod of the front fork assembly therein.

18. A knee scooter as recited in claim 17 wherein the steering tube assembly is engaged at the vertex of the chassis for movement between a first position wherein the steering tube assembly extends transverse to the plane of the chassis, and a second position wherein the steering tube assembly lies substantially parallel to the plane of the chassis.

19. A knee scooter as recited in claim 18 further comprising a latch mechanism including a projection extending from the steering tube assembly and a release knob mounted on the chassis, the release knob being engageable with the projection for selectively holding the steering tube assembly in the first position.

20. A knee scooter as recited in claim 19 further comprising:
   a front wheel engaged with the first end of the rod of the front fork assembly and a pair of rear wheels, wherein each rear wheel is engaged with a respective extension of the chassis;
   a handle bar engaged with the second end of the rod of the front fork assembly for rotating the front wheel to steer the knee scooter; and
   a hand brake including a lever with a brake pad rotatably mounted on the front fork assembly and an activator mounted on the handle bar for operating the lever to establish contact between the brake pad and the front wheel to stop the knee scooter.

* * * * *